United States Patent [19]

Maitani et al.

[11] 4,290,681

[45] Sep. 22, 1981

[54] PROGRAMMED SHUTTER DEVICE

[75] Inventors: Yoshihisa Maitani; Katsuhiko Tsunefuji, both of Hachioji, Japan

[73] Assignee: Olympus Optical Co., Ltd., Tokyo, Japan

[21] Appl. No.: 105,502

[22] Filed: Dec. 20, 1979

[30] Foreign Application Priority Data

Dec. 27, 1978 [JP] Japan ................................. 53-163287

[51] Int. Cl.³ ............................................. G03B 9/24
[52] U.S. Cl. ..................................... 354/230; 354/234; 354/258
[58] Field of Search ............... 354/230, 234, 235, 251, 354/258, 264, 265, 267

[56] References Cited

U.S. PATENT DOCUMENTS 4,118,721 10/1978 Hashimoto ....................... 354/230 X
4,183,646 1/1980 Tsunefuji ......................... 354/251 X Primary Examiner—John Gonzales

[57] ABSTRACT

A tortion coil spring is charged with a driving force for rotation in response to a film winding operation. When a start position regulating member is released from the shutter driving member, the shutter driving member is rotated by the driving force, till it runs against a shutter speed determining member. During said rotation, a connecting mechanism connected to the shutter driving member to be forward and backward reciprocated by the rotation of the shutter driving member makes a forward motion. Two shutter sectors connected to the connecting mechanism are moved by the forward motion to increase the area of an aperture as an exposure hole for a pencil of rays at the fixed rate by the function of a speed control mechanism. After stopped for a fixed time in response to the brightness of the light reflected from a foreground subject, the rotation of the shutter driving member is resumed. When the shutter driving member is released from the shutter speed determining member. Since simultaneously, the connecting mechanism makes a backward motion, the shutter sectors are moved by the backward motion to close the exposure hole immediately.

60 Claims, 12 Drawing Figures

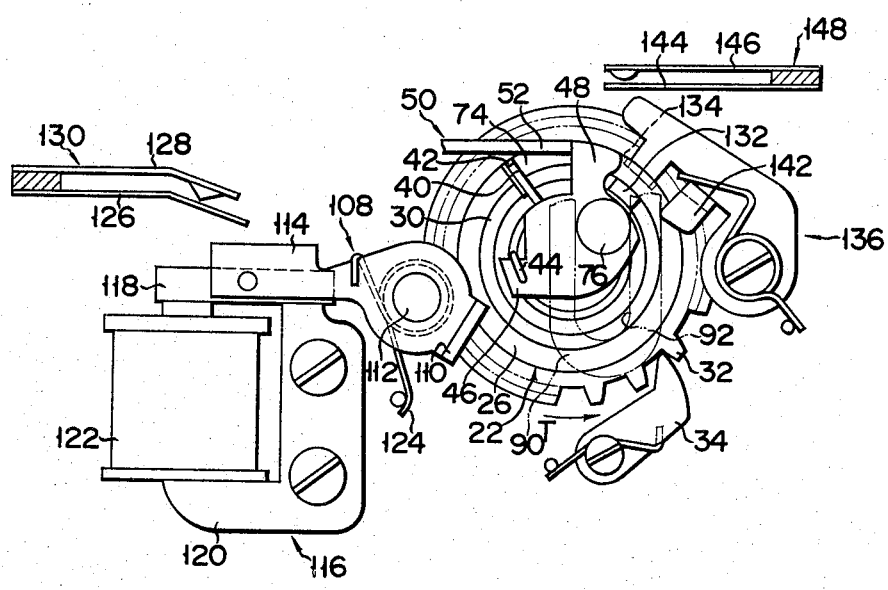

PROGRAMMED SHUTTER DEVICE

This invention relates to a programmed shutter device having a shutter sector which has a function as an aperture blade.

A shutter device is known, which comprises a charge mechanism to be charged with a driving force for rotation in response to a film winding operation, a shutter driving mechanism connected to the charge mechanism to be rotated by the driving force for rotation which is charged in the charge mechanism, and a connecting mechanism connected to the shutter driving mechanism to be forward and backward reciprocated by the rotation of the shutter driving mechanism and connected to the shutter sector means to open an exposure hole and to close the exposure hole alternatively during the shutter driving mechanism is rotated.

The known shutter device is advantageous in some respects. First, its structure is simple. Second, it is put into operable state every time the film is taken up for one frame. Third, it prevents double exposure of the film. The device is, however, disadvantageous in that the shutter sector can take but only two states, in one of which the exposure hole having the fixed area is open and in the other of which the exposure hole is closed. Thus the device cannot make a so-called "programmed shutter device", wherein having a shutter sector which has a function as an aperture blade.

An object of this invention is to provide a programmed shutter device which has such a simple structure as the known shutter device.

According to this invention, there may be provided a programmed shutter device which comprises a charge mechanism to be charged with a driving force for rotation in response to a film winding operation, a shutter driving mechanism connected to the charge mechanism to be rotated by the driving force for rotation which is charged in the charge mechanism, a start position regulating member movable between a first position where the regulating member comes in contact with the shutter driving mechanism to stop the rotation of the shutter driving mechanism and a second position where the regulating member is released from the contact with the shutter driving mechanism to allow the rotation of the shutter driving mechanism, a release controll means holding the start position regulating member in the first position and releasing the hold of the start position regulating member to shift the start position regulating member to the second position, a shutter sector means to define the size of an exposure hole movable between a third position to close the exposure hole and a fourth position to define the exposure hole, a connecting mechanism having an elastic member, the connecting mechanism connected to the shutter driving mechanism to be forward and backward reciprocated by the rotation of the shutter driving mechanism, and connected to the shutter sector means to move the shutter sector means from the third position to the fourth position by the elastic member during the forward motion and from the fourth position to the third position by the rotation of the shutter driving mechanism during the backward motion, a shutter speed determining member movable between a fifth position where the shutter speed determining member is brought in contact with the shutter driving mechanism to stop the rotation of the shutter driving mechanism when the connecting mechanism is completed the forward motion and a sixth position where the shutter speed determining member is released from the contact with the shutter driving mechanism to allow the rotation of the shutter driving mechanism, a shutter speed control means holding the shutter speed determining member in the fifth position for a fixed time in accordance with the light reflected from a foreground subject and releasing the hold of the shutter speed determining member to shift the shutter speed determining member to the sixth position, a speed control mechanism controlling the speed of the forward motion of the connecting mechanism to control the speed of the movement of the shutter sector means from the third position to the fourth position.

This invention can be more fully understood from the following detailed description when taken in conjunction with the accompanying drawings, in which:

FIGS. 1 to 9 are explanatory views for illustrating a programmed shutter device according to an embodiment of this invention, wherein;

FIG. 1 is a partially broken front view of the programmed shutter device;

FIG. 2 is a plan of the device of FIG. 1 excluding a shutter sector means, a connecting mechanism and a speed control mechanism;

FIG. 3 is a front view exclusively showing a start position regulating member and an electrically-controlled shutter means;

FIG. 4 is a perspective disassembly view showing part of a shutter driving mechanism and charge mechanism;

FIG. 5 is a front view showing the states of the start position regulating member and electrically-controlled shutter means of FIG. 3 after completion of a film winding operation;

FIG. 6 is a front view showing the states of the start position regulating member and electrically-controlled shutter means of FIG. 3 after depression of a release button;

FIG. 7 is a perspective view exclusively showing a film winding hook as a component of the charge mechanism of FIG. 2;

FIG. 8 is diagram showing an example of a well-known circuit means for controlling electrically-controlled shutter used for the embodiment;

FIG. 9 shows the relationship between the time elapsed and the area of aperture of an exposure hole defined by the shutter sector means of the embodiment before the sector means returns to a third position where it closes the exposure hole after once moving from the third position to a fourth position where it defines the exposure hole;

Now there will be described an embodiment of this invention with reference to the accompanying drawings.

Figure 1:
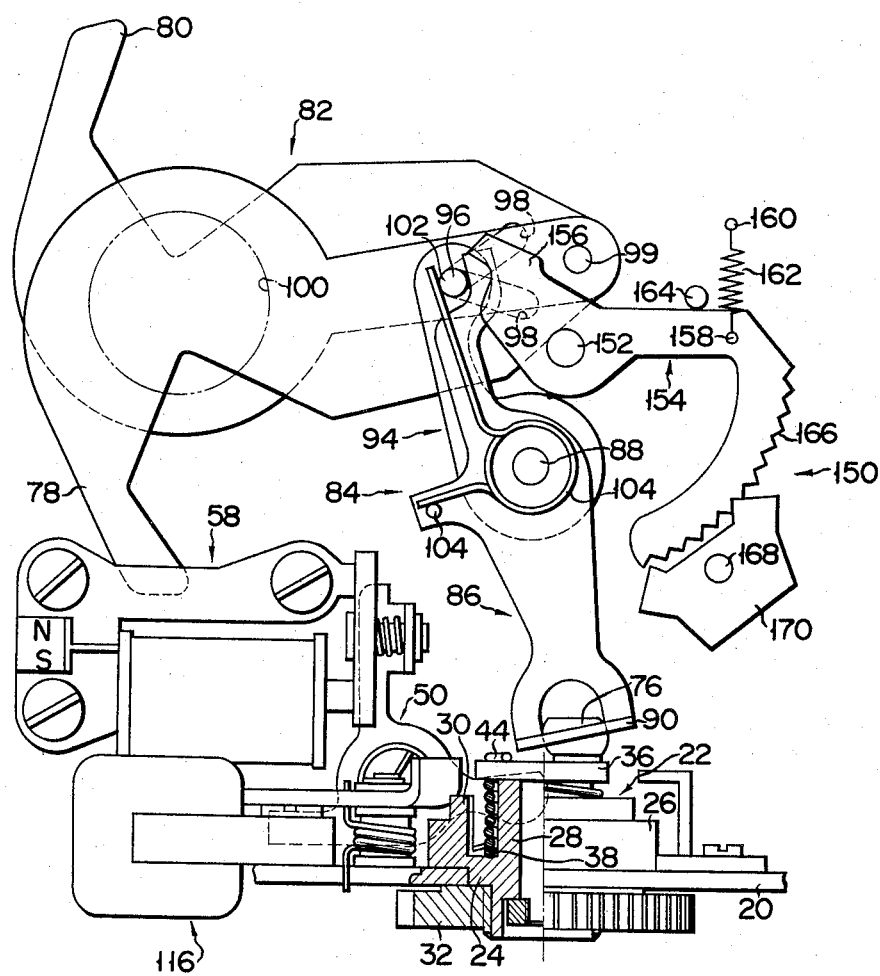

As shown in FIG. 1, a base plate 20 in a camera body (not shown) is provided with a rotatable charge member 22. The charge member 22 is composed of a base portion 24 penetrating the base plate 20 to serve as a rotating shaft, a disc portion 26 laid on the base plate 20 and concentrically coupled with the base portion 24, an internal cylinder portion 28 laid on the disc portion 26 and concentrically connected therewith, and an external cylinder portion 30 disposed on the disc portion 26 so as to form a double cylinder along with the internal cylinder portion 28 and concentrically connected to the disc portion 26. A gear 32 is concentrically fixed on a projection of the base portion 24 protruding from the under surface of the base plate 20. The gear 32, which is operatively connected to a film winding mechanism (not shown) of a well-known construction, is rotated in the direction of an arrow T of FIG. 2 by the film winding action of the film winding mechanism. The gear 32 is engaged by a non-return pawl 34 pivotally mounted on the under surface of the base plate 20 and so urged by a torsion coil spring as to rotate toward the gear 32, as shown in FIG. 2. Thus, the gear 32 is prevented from rotating in the opposite direction of the arrow T.

As shown in FIG. 1, the length of the internal cylinder portion 28 along its center line is greater than that of the external cylinder portion 30 along its center line. On the upper end face of the internal cylinder portion 28, there is a shutter driving member 36 formed on a plate material and constituting a shutter driving mechanism by itself, the member 36 being rotatebly mounted so as to be concentric with the internal cylinder portion 28. A torsion coil spring 38 is wound around the outer peripheral surface of the internal cylinder portion 28. As shown in FIG. 2, a lower end 40 of the torsion coil spring 38 is caught by a notch 42 at the external cylinder portion 30, while an upper end 44 is hooked to a tongue 46 protruding from part of the periphery of the shutter driving member 36.

Figure 6:
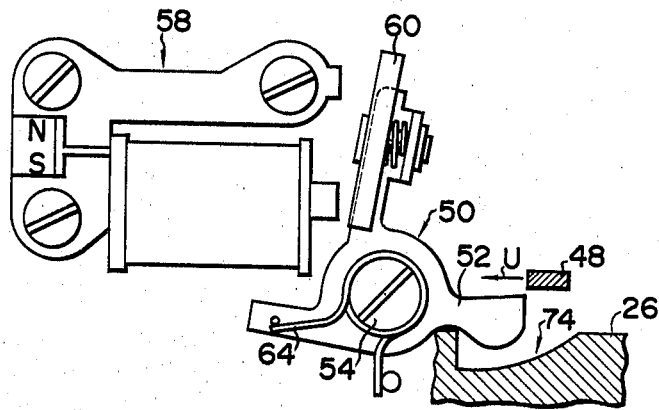

Also, as shown in FIG. 2, an engaging arm 48 protrudes from part of the periphery of the shutter driving member 36. The engaging arm 48 is in contact with a stopper arm 52 which is formed of an arm of a start position regulating member 50. The start position regulating member 50 is allowed to rock along a plane perpendicular to the base plate 20, and has its discoid base portion pivotally mounted on a shaft 54 so as to be shifted between a first position where the member 50 engages the engaging arm 48 of the shutter driving member 36, as shown in FIG. 3, and a second position where the member 50 is released from the engagement with the engaging arm 48 to allow the rotation of the shutter driving member 36, as shown in FIG. 6.

As shown in FIG. 3, moreover, the start position regulating member 50 has another arm 56 protruding upward, and an electrically-controlled shutter means 58 utilizing a release-type electromagnet is disposed on a rocking locus of the arm 56. An attraction block 60 to be attracted to the electrically-controlled shutter means 58 is slidably attached to the upper end portion of the arm 56 by means of a screw and urged to one end of the screw by a buffer spring 62. Wound around the shaft 54 is a torsion coil spring 64 which always urges the start position regulating member 50 to rotate clockwise as in FIG. 3.

The lower end portion of the stopper arm 52 is in contact with the upper end face of the disc portion 26 normally, or before the start of winding operation, as shown in FIG. 3. At this time, the start position regulating member 50 brings the attraction block 60 into contact with the attracting surface of the shutter means 58 against the urging force of the torsion coil spring 64. Normally, therefore, the start position regulating member 50 is located in the first position where the stopper arm 52 is in contact with the engaging arm 48 of the shutter driving member 36 since the attraction block 60 is engaged and attracted by the attracting surface of the shutter means 58. Hereupon, the attraction block 60 is attached to the arm 56 by means of a screw and urged to one end of the screw by the buffer spring 62, so that the arm 56 can rock counterclockwise beyond the position where it is located when the attraction block 60 is brought in contact with the attracting surface of the shutter means 58 by the counterclockwise rocking of the start position regulating member 50. Accordingly, as shown in FIG. 3, the attraction block 60 may be pressed against the attracting surface of the shutter means 58 by working the urging force of the buffer spring 62, thereby securing the attraction block 60 to the attracting surface of the shutter means 58.

The electrically-controlled shutter means 58 is of a well-known construction combining a permanent magnet 66 with an electromagnetic coil 68. In the shutter means 58, the permanent magnet 66 is held between a pair of yokes 70 and 72, and the electromagnetic coil 68 is wound around the yoke and is electrically connected to a circuit means for controlling electrically-controlled shutter which is mentioned later. Normally, the attraction block 60 is attracted and sustained by the magnetic force of the permanent magnet 66. If an exciting current transmitted from the circuit means for controlling the shutter by the depression of a release button flows through the electromagnetic coil 68, however, the coil 68 so acts as to demagnetize the permanent magnet 66, when the attraction of the attraction block 60 by the aforesaid magnetic force is released, allowing the start position regulating member 50 to be rotated clockwise as in FIG. 3 by the urging force of the torsion coil spring 64. The exciting current may otherwise be replaced by a pulse current.

Figure 4:
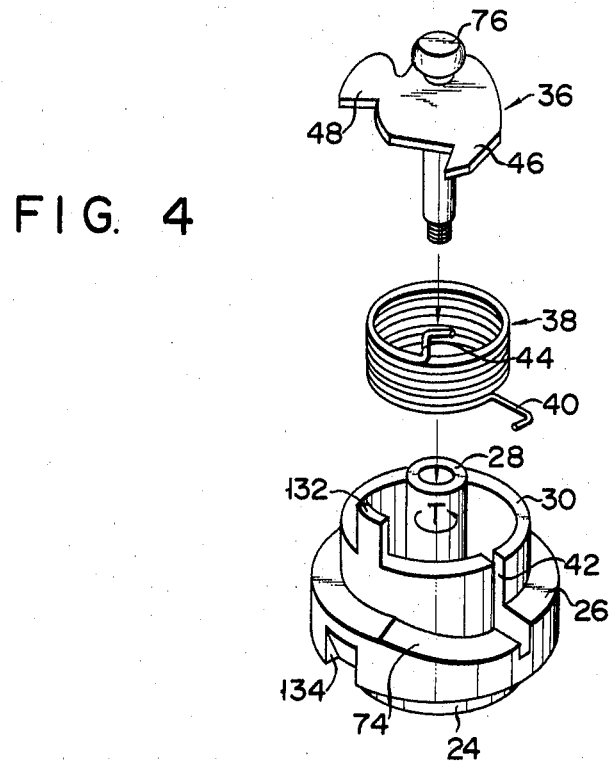
Figure 5:
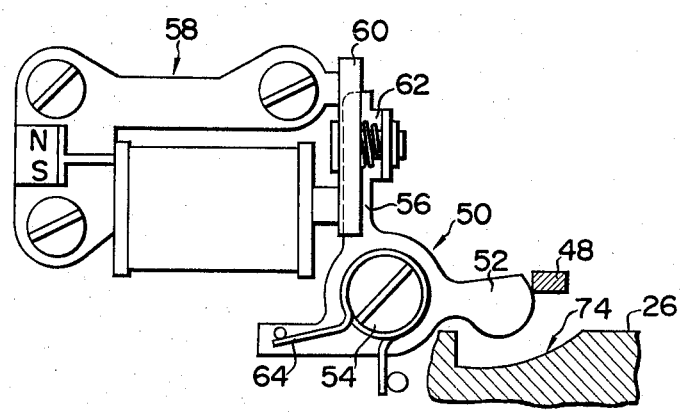

As shown in FIG. 4, a notch 74 with a slope is formed on part of the upper end face of the disc portion 26. The notch 74, as shown in FIG. 5, tends to be located under the lower edge portion of the stopper arm 52 of the start position regulating member 50 when the film winding operation is completed. During the film winding operation, the stopper arm 52 of the start position regulating member 50 is in contact with the engaging arm 48 of the shutter driving member 36, allowing only the charge member 22 to rotate the notch 74 of the disc portion 26 in the aforesaid manner in response to the film winding operation, so that the torsion coil spring 38 is charged with driving force for rotation.

When the release button is depressed, the electrically-controlled shutter means 58 demagnetize the magnet 66, as aforesaid, and the start position regulating member 50 is rotated clockwise by the urging force of the torsion coil spring 64, as shown in FIG. 6. Then, the engagement between the stopper arm 52 of the start position regulating member 50 and the engaging arm 48 of the shutter driving member 36 is released, and the shutter driving member 36 is rotated by the driving force of the torsion coil spring 38 in a direction of an arrow U of FIG. 6, or the direction of the arrow T of FIG. 2.

When the charge member 22 is rotated for a next cycle of the film winding operation, the slope of the notch 74 comes in contact with the lower edge portion of the stopper arm 52, thereby rotating the start position regulating member 50 in the counterclockwise direction of FIG. 6 against the urging force of the torsion coil spring 64. Then, as shown in FIG. 3, the attraction block 60 is attracted by the electrically-controlled shutter means 58 to come into contact with the attracting surface of the shutter means 58. At the same time, the stopper arm 52 is located on the rocking locus of the engaging arm 48 of the shutter driving member 36 to be allowed again to come into contact with the engaging arm 48.

Turning now to FIGS. 1 and 2, a barrel-shaped driving pin 76 is attached to the top face of the shutter driving member 36 near the periphery thereof. Above the shutter driving member 36, as shown in FIG. 1, there is a connecting mechanism 84 extending in the vertical direction. The upper end of the connecting mechanism 84 is coupled to a shutter sector means 82 formed of a pair of shutter sectors 78 and 80 and the lower end of the connecting mechanism 84 is coupled to the shutter driving member 36 across the driving pin 76.

The connecting mechanism 84 includes a driving lever 86 which extends in the vertical direction as shown in FIG. 1. An upper end of the driving lever 86 crosses the basal parts of the paired shutter sectors 78 and 80, and a lower end of it is located above the top face of the shutter driving member 36. The middle portion of the driving lever 86 is pivotally mounted on the camera body (not shown) by means of a shaft 88 so as to allow the lever 86 to rock along a plane perpendicular to the top face of the shutter driving member 36. The lower end of the driving lever 86, as shown in FIG. 1, is bent along the top face of the shutter driving member 36, constituting a driven portion 90. As shown in FIG. 2, a slot 92 is defined in the driven portion 90, and the driving pin 76 is inserted in the slot 92, thereby connecting the driving lever 86 to the shutter driving member 36. Accordingly, the driving lever 86 is rocked by the driving pin 76 when the shutter driving member 36 is rotated by the aforesaid driving force of the torsion coil spring 38. Hereupon, the upper and lower ends of the driving lever 86, as viewed specifically, reciprocate.

The connecting mechanism 84 further includes a shutter sector switching lever 94 adjoining the driving lever 86. The lower end portion of the switching lever 94 is rockably mounted on the shaft 88, and the upper end portion crosses the basal parts of the paired shutter sectors 78 and 80.

A shutter sector driving pin 96 protrudes from both front and rear sides of the upper end portion of the shutter sector switching lever 94, extending at right angles to the surface of the paper which FIG. 1 is drawn. A projected portion of the shutter sector driving pin 96 extending from the rear side of the upper end portion of the shutter sector switching lever 94 is coupled with the paired shutter sectors 78 and 80 by penetrating both slots 98 that are bored through the respective basal parts of the paired shutter sectors 78 and 80. The paired shutter 78 and 80 have their respective basel parts rockably mounted on the camera body (not shown) by means of one and the same shaft 99, constituting a pario-type shutter as it is called. When the shutter sector switching lever 94 rotates in the clockwise direction of FIG. 1 to perform forward action, the paired shutter sectors 78 and 80 rotate clockwise and counterclockwise, respectively, to be located in a fourth position where an exposure hole of predetermined size is defined within a pencil of rays 100 obtained at full aperture opening. On the other hand, when the shutter sector switching lever 94 roates counterclockwise to perform backward action, the paired shutter sectors 78 and 80 rotate oppositely to the aforesaid direction, and are located in a third position where the exposure hole is closed, as shown in FIG. 1.

Moreover, a projected portion of the shutter sector driving pin 96 extending from the front side of the upper end portion of the shutter sector switching lever 94 is located in the locus of reciprocation of the upper end of the driving lever 86 so as to be allowed only to engage the left edge of the upper end of the lever 86, constituting a direct transmission member 102 as a component of the coupling mechanism 94. Also, the connecting mechanism 84 is provided with a torsion coil spring 104 wound around the shaft 88.

One end of the torsion coil spring 104 is supported by a fixed pin 106 fixed on the front side of the driving lever 86, while the other end is pressed against the direct transmission member 102 in the clockwise direction from the left, thereby urging the shutter sector switching lever 94 to rotate clockwise.

The direct transmission member 102 of the shutter sector switching lever 94 which is urged to rotate clockwise by the torsion coil spring 104 is normally in contact with the left edge of the upper end of the driving lever 86.

When the driving lever 86 rotates in the clockwise direction of FIG. 1 to causes its lower end to perform forward action, the torsion coil spring 104 rotates the shutter sector switching lever 94 in the clockwise direction of FIG. 1 for forward action by its own elasticity. When the driving lever 86 rotates in the counterclockwise direction of FIG. 1 to cause its lower end to perform backward action, the direct transmission member 102 comes in contact with the left edge of the upper end of the driving lever 86, and the shutter sector switching lever 94 is rotated in the counterclockwise direction of FIG. 1 for backward action by the backward action, or counterclockwise rotation of the driving lever 86.

Having the aforementioned functions, the torsion coil spring 104 and the direct transmission member 102 constitute a transmission mechanism as part of the connecting mechanism 84. The connecting mechanism 84 includes the driving lever 86 and the shutter sector switching lever 94, besides the transmission mechanism.

As shown in FIG. 2, one arm 110 of a shutter speed determining member 108 is disposed on the rotating locus of the engaging arm 48 of the shutter driving member 36. The shutter speed determining member 108 is pivotally mounted on the base plate 20 by means of a shaft 112 so as to rotate in parallel with the top face of the base plate 20. The other arm 114 of the shutter speed determining member 108 extends away from the charge member 22, and an attraction block 118 to be attracted to an electrical shutter speed control means 116 is attached to the end portion of the arm 114.

The electrical shutter speed control means 116 is composed of a substantially U-shaped yoke 120 and an exciting coil 122 wound around the yoke 120 and electrically connected with the circuit means for controlling electrically-controlled shutter as mentioned later. When an exciting current transmitted from the circuit means flows through the exciting coil 122, the attraction block 118 is attracted and retained by magnetic force. When the exciting current is interrupted, the retention of the attraction block 118 by the magnetic force is released, and the shutter speed determining member 108 is allowed to rock freely.

A torsion coil spring 124 is wound around the shaft 112 of the shutter speed determining member 108. By the urging force of the torsion coil spring 124, the shutter speed determining member 108 is induced always to rock in the counterclockwise direction of FIG. 2. Accordingly, the attraction block 118 is normally brought in contact with the attracting surface of the electrical shutter speed control means 116. When the exciting current is caused to flow through the exciting coil 122 under such condition, the shutter speed determining member 108 immediately attracts and securely holds the attraction block 118 by magnetic force. At this time, the arm 110 of the shutter speed determining member 108 is disposed on the rotating locus of the engaging arm 48 of the shutter driving member 36, and is allowed to be in contact with the engaging arm 48. The position of the shutter speed member 108 in this state is defined as a fifth position.

The exciting coil 122 is already excited when the shutter driving member 36 is released from the engagement with the stopper arm 52 to start rotation in the direction of the arrow T of FIG. 2 by means of the aforementioned driving force of the torsion coil spring 38. Thus, the engaging arm 48 is brought in contact with the arm 110 of the shutter speed determining member 108, so that the shutter driving member 36, which has been rotated in the direction of the arrow T, stops rotating where the contact is made. The position where the engaging arm 48 is brought in contact with the arm 110 corresponds to a point of time when the forward action of the driving lever 86 which is driven by the rotation of the shutter driving member 36 is completed. When the supply of the exciting current to the exciting coil 122 is interrupted, the shutter driving member 36 resumes the rotation caused by the driving force of the torsion coil spring 38, and rocks the shutter speed determining member 108 clockwise against the urging force of the torsion coil spring 124 to locate the member 108 in a sixth position where the rotation of the shutter driving member 36 is allowed, and then accomplishes the remaining portion of the rotation.

On the locus of the rotation of the shutter speed determining member 108 from the fifth position to the sixth, there is disposed a normally open X-contact switch 130 which is formed of a pair of elastic contacts 126 and 128. The X-contact switch 130 is pressed by the arm 114 to be turned on when the shutter speed determining member 108 is rotated from the fifth position to the sixth by the shutter driving member 36.

As shown in FIGS. 2 and 4, a stopper projection 132 protrudes upward from the upper end face of the external cylinder portion 30 of the charge member 22, the upper end of the stopper projection 132 being disposed on the rotating locus of the engaging arm 48. The stopper projection 132 is so designed as to be located near the engaging arm 48 at completion of the film winding operation. The shutter driving member 36, which has been released from the engagement with the start position regulating member 50 and the shutter speed determining member 108 and rotated, finally stops the rotation when it runs against the stopper projection 132.

Also as shown in FIGS. 2 and 4, an engaging groove 134 is formed on the peripheral surface of the disc portion 26 along a radial line connecting the stopper projection 132 with the center of the charge member 22.

Figure 7:
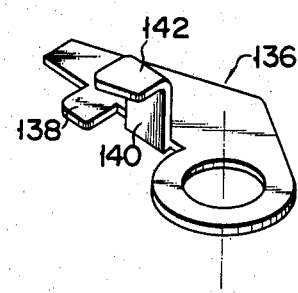

A film winding hook 136 is disposed in the vicinity of the charge member 22. As shown in FIG. 2, one end portion of the film winding hook 136 is mounted on the top face of the base plate 20 by a shaft so as to be able to rock in parallel therewith. A torsion coil spring is wound around the shaft, and the film winding hook 136 is urged by the urging force of the torsion coil spring always to rock in the counterclockwise direction of FIG. 2. The other end of the film winding hook 136 urged by the torsion coil spring is always in contact with the peripheral side face of the disc portion 26 of the charge member 22, having a hook portion 138 formed thereon, as shown in FIG. 7. Further, as shown in FIG. 7, a tongue portion 140 extending upward at right angles to the base plate 20 protrudes from a side edge portion of the film winding hook 136 which faces the peripheral side face of the disc portion 26. As shown in FIGS. 2 and 7, the upper end portion of the tongue portion 140 is bent toward the rotating locus of the engaging arm 48, constituting an engagement release arm 142.

The film winding hook 136 of the above-mentioned construction operates in the following manner. Before and during the film winding operation, the hook portion 138 is in contact with the peripheral side face of the disc portion 26 of the charge member 22. When the film winding operation is completed, the hook portion 138 engages the engaging groove 134 to stop the rotation of the charge member 22. Since the shutter driving member 36 is prevented from rotation by the start position regulating member 50 during the film winding operation, the torsion coil spring 38 is charged with driving force for rotation between the charge member 22 stopped from rotating by the hook portion 138 and the shutter driving member 36 at completion of the film winding operation. This state is shown in FIG. 2. The charge member 22, torsion coil spring 38, and the film winding hook 136 constitute a charge mechanism to charge driving force for rotation in response to the film winding operation.

Subsequently, when the release button (not shown) is depressed, the engagement between the stopper arm 52 of the start position regulating member 50 and the engaging arm 48 of the shutter driving member 36 is released, and the shutter driving member 36 starts to rotate in the direction of the arrow T of FIG. 2 by means of the driving force with which the torsion coil spring 38 is charged. The shutter driving member 36, which has resumed rotation after being once stopped from rotating by the shutter speed determining member 108, rotates the film winding hook 136 in the clockwise direction of FIG. 2 against the urging force of the torsion coil spring by running against the engagement release arm 142 of the film winding hook 136. Then, the hook portion 138 of the film winding hook 136 is released from the engagement with the engaging groove 134 formed on the disc portion 26 of the charge member 22. Thereafter, the engaging arm 48 comes in contact with the stopper projection 132 of the charge member 22, so that the shutter driving member 36 rotates in the direction of the arrow T of FIG. 2 along with the charge member 22, and finally stops its rotation together with the charge member 22 when the engaging arm 48 again runs against the stopper arm 52 of the start position regulating member 50.

Further, as shown in FIG. 2, a normally opened hold release switch 148 formed of a pair of elastic contacts 144 and 146 is disposed on the rocking locus of the other end of the film winding hook 136. The hold release switch 148, which is electrically connected to the circuit means for controlling electrically-controlled shutter as mentioned later, is intended for releasing the connection between the circuit means and an external power source at completion of the film winding operation. The switch 148 is turned off when the hook portion 138 of the film winding hook 136 is brought in contact with the peripheral side face of the disc portion 26. On the other hand, the switch 148 is turned on when the hook portion 138 of the film winding hook 136 gets engaged with the engaging groove 134 on the disc portion 26.

The connecting mechanism 84 is provided with a speed control mechanism 150 which is disposed in the vicinity of the connecting mechanism 84 and controls the speed of the forward action of the mechanism 84.

The speed control mechanism 150 includes a partial escape wheel 154 mounted on the camera body (not shown) by means of a shaft 152 so as to be able to rock in the same plane with the rocking locus of the shutter sector switching lever 94, as shown in FIG. 1. The partial escape wheel 154 has a lever 156 with one end disposed in the rocking locus of the direct transmission member 102 of the shutter sector switching lever 94. A tension spring 162 is stretched between a hole 158 which is bored through the partial escape wheel 154 and a fixed pin 160 on the camera body (not shown). By the urging force of the tension spring 162, the partial escape wheel 154 is always urged to rotate in the counterclockwise direction of FIG. 1. Within the rocking locus of the partial escape wheel 154, there is a pin 164 fixed on the camera body. The partial escape wheel 154, which is urged to rotate counterclockwise by the urging force of the tension spring 162, is stopped from rotation in a predetermined position where it is brought in contact with the fixed pin 164. At this time, the one end of the lever 156 is disposed at a fixed distance from the direct transmission member 102 of the shutter sector switching lever 94 which locates the paired shutter sectors 78 and 80 in the third position, as shown in FIG. 1, constituting a delay mechanism.

In the vicinity of a tooth portion 166 of the partial escape wheel 154, there is an anchor escapement 170 mounted on the camera body by means of a shaft 168 so as to be able to rock in the same plane as the rocking locus of the partial escape wheel 154, as shown in FIG. 1.

The anchor escapement 170 engages the tooth portion 166 of the partial escape wheel 154 to control the rocking speed of the wheel 154 when the one end of the lever 156 of the wheel 154 runs against the direct transmission member 102 of the shutter sector switching lever 94, which has rotated clockwise for forward action, to cause the partial escape wheel 154 to be rocked in the clockwise direction of FIG. 1 by the shutter sector switching lever 94 in the forward action. The speed of the movement of the paired shutter sectors 78 and 80 from the third position to the fourth, as well as the speed of the forward action of the shutter sector switching lever 94, may also be controlled, because the rocking speed of the partial escape wheel 154 is controlled.

When the shutter sector switching lever 94 starts rotating in the counterclockwise direction of FIG. 1 for backward action, on the other hand, the partial escape wheel 154 begins to rotate counterclockwise, induced by the urging force of the tension spring 162. Hereupon, the anchor escapement 170 is moved by a known means to such a position that it never engages the tooth portion 166, so that the speed of the counterclockwise rotation of the partial escape wheel 154 will not be controlled.

Figure 8:
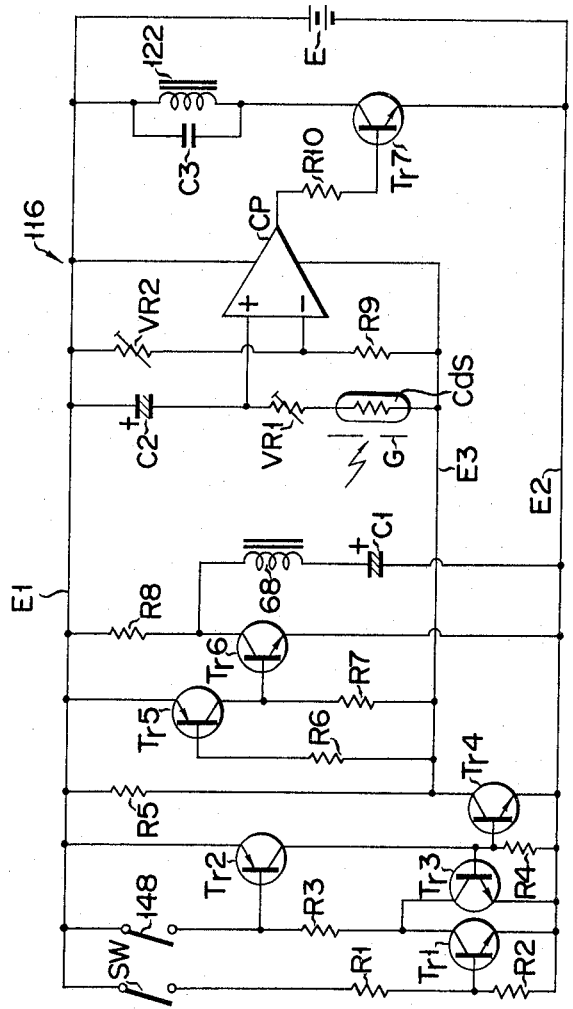

Referring now to FIG. 8, there will be described a circuit means 172 for controlling electrically-controlled shutter available for the above-mentioned embodiment of this invention.

In FIG. 8, a series circuit of a release switch SW operated by depressing the release button (not shown) and resistors R1 and R2, a series circuit of the hold release switch 148, a resistor R3, and a starting transistor $T_r1$, a series circuit of a holding transistor $T_r2$ and a resistor R4, a series circuit of a resistor R5 and a transistor $T_r4$ for trigger and voltage impression, a series circuit of the exciting coil 122 of the electrical shutter speed control means 116 and a switching transistor $T_r7$, and a series circuit of a resistor R8, the exciting coil 68 of the electrically-controlled shutter means 58, and a capacitor C1 are connected between an operating voltage supply line E1 connected to the positive electrode of a power source E and an operating voltage supply line E2 connected to the negative electrode.

The transistor $T_r1$ has its base connected to the node between the resistors R1 and R2, emitter connected to the line E2, and collector connected to the resistor R3. The transistor $T_r2$ has its base connected to the node between the resistor R3 and hold release switch 148, emitter connected to the line E1, and collector connected to the resistor R4. The transistor $T_r1$ is connected in parallel with a holding transistor $T_r3$. Namely, the transistor $T_r3$ has its collector connected to the collector of the transistor $T_r1$, emitter connected to the line E2, and base connected to the collector of the transistor $T_r2$.

The transistor $T_r4$, which has its base connected to the collector of the transistor $T_r2$, emitter to the line E2, and collector to the resistor R5, supplies an operating voltage to a voltage supply line E3 drawn out from the collector. Connected between the lines E1 and E3 are a photometric control circuit as the principal part of the circuit means for controlling electrically-controlled shutter and a driving circuit for the exciting coil 68 of the electrically-controlled shutter means 58. Practically, therefore, the transistor $T_r4$ serves both as a power switch and a trigger switch for the photometric control circuit.

The driving circuit for the exciting coil 68 of the electrically-controlled shutter means 58 is composed of a series circuit of a transistor $T_r5$ and a resistor R7 connected between the lines E1 and E3, and a transistor $T_r6$ connected in parallel with the series circuit of the exciting coil 68 of the electrically-controlled shutter means 58 and the capacitor C1. That is, the transistor $T_r5$ has its base connected to the line E3 through a resistor R6, emitter connected to the line E1, and collector connected to the line E3 via the resistor R7, while the transistor $T_r6$ has its base connected to the collector of the transistor $T_r5$, emitter connected to the line E2, and collector connected to the line E1 via the resistor R8. The driving circuit for the exciting coil 68 of the electrically-controlled shutter means 58, which normally charges the capacitor C1 with electric charges from the power source E through the resistor R8 and exciting coil 68, actuates the exciting coil 68 to remove the magnetic force attracted thereto by at once applying the electric charges in the capacitor C1 to the exciting coil 68 through the transistor $T_r6$ when the transistors $T_r5$ and $T_r6$ are turned on, accompanying the transistor $T_r4$.

In the photometric control circuit, moreover, a time constant circuit formed of a series circuit of a capacitor C2, a variable resistor VR1 and a photo-electric element CdS, a voltage divider circuit formed of a series circuit of a variable resistor VR2 and a resistor R9, and a comparator CP are connected between the lines E1 and E3.

The variable resistor VR1 electrically corrects the working delay of the exciting coil 68 of the electrically-controlled shutter means 58. The node between the variable resistor VR1 and the capacitor C2 of the time constant circuit is connected to one input terminal of the comparator CP. The photo-electric element CdS receives reflected light from a foreground subject through an ASA speed switching stop G, varies its resistance value according to the brightness of the reflected light, and determines the resistance of the time constant circuit, as well as the resistance value of the variable resistor VR1. The variable resistor VR2 of the voltage divider circuit is a resistor for the automatic level adjustment of the comparator CP. The node between the variable resistor VR2 and the resistor R9 is connected to the other input terminal of the comparator CP. Accordingly, the inverted working potential of the comparator CP is determined by adjusting the resistance value of the variable resistor VR2.

The comparator CP applies its output voltage to the switching transistor $T_r7$ through a resistor R10 to turn on the transistor $T_r7$ as soon as the transistor $T_r4$ is turned on. When a fixed amount of electric charge is stored in the capacitor C2 of the time constant circuit, the comparator CP performs inverted working to stop the impression of the output voltage on the transistor $T_r7$, thereby turning the transistor $T_r7$ off.

The exciting coil 122 of the electric shutter speed control means 116 is connected to a capacitor C3 for preventing reverse voltage.

Now there will be described the operation of thus constructed circuit means 116 for controlling electrically-controlled shutter in connection with the operations of the above-mentioned various mechanisms and means, such as the charge mechanism, connecting mechanism, etc.

When a film winding operation is performed, the charge member 22 makes substantially one revolution in the direction of the arrow T of FIG. 2, the hook portion 138 of the film winding hook 136 engages the engaging groove 134 on the peripheral side face of the disc portion 26, and the hold release switch 148 is opened. At the same time, the torsion coil spring 38 is charged with driving force for rotation which tends to rotate the shutter driving member 36 in the counterclockwise direction of FIG. 2. Since the start position regulating member 50 attracted and held by the magnetic force of the electrically-controlled shutter means 58, however, is in contact with the engaging arm 48 of the shutter driving member 36, the shutter driving member 36 is stopped at the start position.

In photographing in this situation, a shutter button (not shown) is depressed to close the release switch SW in the circuit means 116 shown in FIG. 8. When the switch SW is closed, the transistor $T_r1$ is turned on, and hence the transistors $T_r2$, $T_r3$, and $T_r4$ are all turned on. Then, if the finger pressure is removed from the shutter button to open the switch SW and to turn the transistor $T_r1$ off, the holding transistor $T_r3$, maintain a conducting state, so that the transistors $T_r2$ and $T_r4$ remains on, thus forming a holding circuit.

When the transistor $T_r4$ is caused to be conducting state, the operating voltage from the power source E is applied to the line E3, so that the transistors $T_r5$ and $T_r6$ are immediately turned on, and the output voltage of the comparator CP is applied to the transistor $T_r7$ to turn the transistor $T_r7$ on. Thus, a current is caused to flow through the exciting coil 122 of the electric shutter speed control means 116 to excite the coil 122. When the transistor $T_r6$ is turned on, the electric charge which has so far been supplied to the capacitor C1 through the resistor R8 is pulsatively introduced at once into the exciting coil 122 of the electrically-controlled shutter means 58 to demagnetize the shutter means 58.

When the electrically-controlled shutter means 58 is demagnetized, the attraction block 60 which has so far been attracted and held by the magnetic force of the shutter means 58 is set free, the start position regulating member 50 is rotated clockwise around the shaft 54 by the urging force of the torsion coil spring 64, as shown in FIG. 6, the engagement between the stopper arm 52 and the engaging arm 48 is released, and the shutter driving member 36 starts rotation in the direction of the arrow T of FIG. 2 by the driving force of the torsion coil spring 38.

The rotated shutter driving member 36 runs against the shutter speed determining member 108 that is attracted and held by the electromagnetic force of the already excited electrical shutter speed control means 116, and is temporarily prevented from rotation.

The connecting mechanism 84 operates in the following manner after the shutter driving member 36 starts rotation and before it runs against the shutter speed determining member 108. The driving lever 86 rapidly rotates in the clockwise direction of FIG. 1 for forward motion in response to the rotation of the shutter driving member 36. In response to the forward motion of the driving lever 86, the shutter sector switching lever 94 starts rotation in the clockwise direction of FIG. 1 along with the driving lever 86 by the elastic force of the torsion coil spring 104. However, the start of rotation of the shutter sector switching lever 94 is a little delayed from one of the driving lever 86, due to the inertia of the paired shutter sectors 78 and 80. After the start of rotation, the shutter sector switching lever 94 rotates at gradually increasing speed until the direct transmission member 102 bumps into the one end of the lever 156 of the partial escape wheel 154. After the direct transmission member 102 is brought in contact with the one end of the lever 156, the shutter sector switching lever 94 rotates slowly at a fixed speed in the clockwise direction of FIG. 1 by the working of the speed control mechanism 150. Further, after the start of rotation of the shutter sector switching lever 94 and before the collision between the direct transmission member 102 and the one end of the lever 156, the paired shutter sectors 78 and 80 rotate in the clockwise and counterclockwise directions of FIG. 1, respectively, although no exposure hole is defined in the pencil of rays 100 yet. At a point of time when the direct transmission member 102 runs against the one end of the lever 156, the paired shutter sectors 78 and 80 define the smallest aperture as a stop in the pencil of rays 100.

Namely, the existence of the delay mechanism keeps the paired shutter sectors 78 and 80 from working as the stop for the pencil of rays 100 until the rotating speed of the shutter sector switching lever 94 is fixed. Thus, while the shutter sector switching lever 94 is being rotated slowly by the elastic force of the torsion coil spring 104 at the fixed speed controlled by the speed control mechanism 150, the paired shutter sectors 78 and 80 can gradually increase the area of aperture at a fixed rate, starting with the smallest aperture as the stop for the pencil of rays 100. At a point of time when the direct transmission member 102 of the shutter sector switching lever 94, which has been rotated by the elastic force of the torsion coil spring 104, is brought in contact with the driving lever 86 which is held in the position where it has finished its forward motion by the working of the shutter speed determining member 108, the paired shutter sectors 78 and 80 provides a full aperture state.

Meanwhile, a current for demagnetization from the capacitor C1 flows through the exciting coil 68 of the electrically-controlled shutter means 58, when the working of the photometric control circuit is started. In the photometric control circuit, the quantity of reflected light from the foreground subject is integrated by the time constant circuit including the capacitor C2, the photo-electric element CdS, and the resistor VR1, and the obtained integral value is applied to the comparator CP. Namely, the time constant of the time constant circuit is $C_{V2} \times (R_{CdS} + R_{VR1})$ where the resistance value determined correspondingly to the photometric value of the photo-electric element CdS is $R_{CdS}$ and the resistance value of the variable resistor VR1 is $R_{VR1}$. As generally known, the time which the capacitor C2 is charged corresponding to the time constant determines the proper shutter speed for the subject. When the electric potential at the input terminal of the comparator CP based on the charging potential of the capacitor C2 reaches the divided potential of the resistors VR2 and R9 after the lapse of the time for such charging, the comparator CP is actuated, and the power supply to the exciting coil 68 of the electrically-controlled shutter means 58 is cut off.

The exciting coil 68, disconnected from the power source, releases its hold of the shutter speed determining member 108. Then, the shutter driving member 36 resumes the rotation in the direction of the arrow T of FIG. 2, pushing aside the shutter speed determining member 108 by means of the driving force of the torsion coil spring 38. After restarting the rotation, the shutter driving member 36 rotates rapidly until it runs against the stopper projection 132 of the charge member 22. At this time, the driving lever 86 rotates in the counterclockwise direction of FIG. 1 for backward motion, immediately responding to the backward motion of the shutter driving member 36. The upper end of the driving lever 86 in the backward motion runs against the direct transmission member 102 of the shutter sector switching lever 94 to rotate the shutter sector switching lever 94 in the counterclockwise direction of FIG. 1 for backward motion at the same speed of the revolution with the driving lever 86. In contrast with the aforementioned case, therefore, the paired shutter sectors 78 and 80 rapidly rotate counterclockwise and clockwise, respectively, quickly closing the exposure hole defined in the pencil of rays 100, as shown in FIG. 1.

On the other hand, the shutter driving member 36 pushes the film winding hook 136 to remove the hook portion 138 from the engaging groove 134 of the charge member 22 immediately before running into the stopper projection 132, thereby allowing the next cycle of film winding operation to be started.

When the film winding hook 136 is pushed and moved, the hold release switch 148 is closed. As a result, in the circuit means as shown in FIG. 8, the transistor $T_r2$ is turned off, and hence the transistors $T_r3$ and $T_r4$ are also turned off, thereby the power supply is stopped. Accordingly, hardly any currents flow through the circuit, only leaving dark currents in the transistors. Further, since the transistor $T_r4$ is turned off, the transistors $T_r5$ and $T_r6$ are also turned off, and the capacitor C1 is charged with electric charges from the power source E through the resistor R8 and the exciting coil 68 of the electrically-controlled shutter means 58 for the next photographing operation. When the charging of the capacitor C1 is finished, the charging current is gone, and substantially no currents flow through the circuit as a whole.

Thus is completed the photographing of one frame by utilizing the circuit means for controlling electrically-controlled shutter without using the flash, the electronic flash, or something like that.

Where the foreground subject is very bright, and consequently when a high shutter speed is set at which a proper exposure time is immediately determined by the photometric function of photo-electronic element CdS, the power supply to the exciting coil 68 is cut off before the engaging arm 48 of the shutter driving member 36 is brought in contact with the shutter speed determining member 108. Then, the shutter driving member 36 makes substantially one revolution at a stroke until it runs against the stopper projection 132, without being prevented from rotation by the shutter speed determining member 108.

Figure 9:
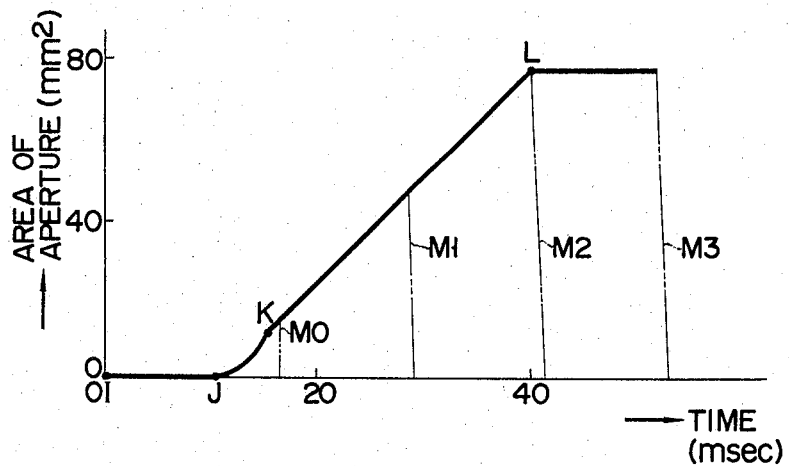

FIG. 9 schematically shows, by a time-based curve, the area of aperture obtained during a period from the start to the end of the above-mentioned operation of the paired shutter sectors 78 and 80 according to an embodiment.

In FIG. 9, symbol I represents the point of time when the release button (now shown) is depressed; J the time when the shutter sector switching lever 94 starts rotating in the clockwise direction of FIG. 1, K the time when the direct transmission member 102 of the shutter sector switching lever 94 runs against the one end of the lever 156 of the partial escape wheel 154, and L the time when the direct transmission member 102 of the shutter sector switching lever 94 runs against the upper end portion of the driving lever 86. Chain lines M0, M1, M2, and M3 represent changes in the area of aperture of the paired shutter sectors 78 and 80 quickly rotated by the shutter sector switching lever 94 which is rapidly rotated in the counterclockwise direction of FIG. 1 after the passage of different exposure times. The curve of FIG. 9 is characteristic of the programmed shutter.

It is to be understood that the above-mentioned embodiment is for purpose of illustration only and is not intended as a definition of the limits of the invention, and that various changes and modifications may be effected therein by one skilled in the art without departing from the scope or spirit of the invention.

For example, although in the above embodiment the torsion coil spring 104 wound around the shaft 88 is used for the spring to constitute the transmission mechanism, it may be replaced by a tension spring one end of which is caught by the shutter sector switching lever 94 and the other end of which is caught by the driving lever 86.

Figure 10:
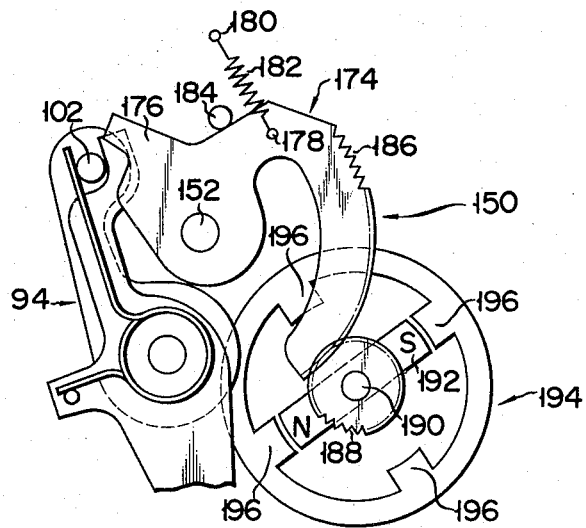
FIG. 10 is a front view of a modification of the speed control mechanism as shown in FIG. 1.
Figure 11:
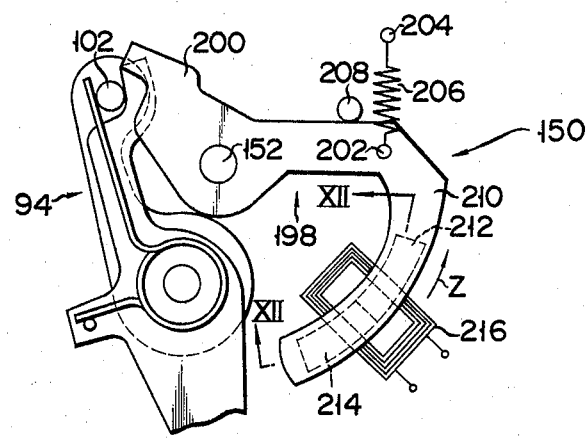
FIG. 11 is a front view of another modification of the speed control mechanism of FIG. 1.

As for the speed control mechanism 150, it is not limited to the combination of the partial escape wheel 154 and anchor escapement 170 as shown in FIG. 1, and may otherwise be one as shown in FIG. 10 or 11.

In a modification of the speed control mechanism 150 of FIG. 10, the partial escape wheel 154 for the above-mentioned embodiment is replaced by a sector wheel 174 rotating about the shaft 152. Like the escape wheel 154 of FIG. 1, the sector wheel 174 is provided with a lever 176 one end of which intersects the rocking locus of the direct transmission member 102 of the shutter sector switching lever 94. Further, the sector wheel 74 has an hole 178 formed therein, and a tension spring 182 is stretched between the hole 178 and a pin 180 fixed on the camera body (not shown). By the urging force of the tension spring 182, the sector wheel 174 is always urged to rotate in the counterclockwise direction of FIG. 10. Within the rocking locus of the sector wheel 174, there is a pin 184 fixed on the camera body. The sector wheel 174, which is urged to rotate counterclockwise by the urging force of the tension spring 182, is stopped from rotation in a predetermined position where it is brought in contact with the fixed pin 184. At this time, the one end of the lever 176 is disposed at a fixed distance from the direct transmission member 102 of the shutter sector switching lever 94 which locates the paired shutter sectors 78 and 80 in the third position, as shown in FIG. 10, constituting a delay mechanism. Further, a pinion 188 engages a toothed portion 186 of the sector wheel 174. The pinion 188 is is mounted on the camera body by means of a shaft 190 so as to be rockable on the same plane with the rocking locus of the sector wheel 174. The longitudinal middle portion of a bar magnet 192 is fixed on the shaft 190, and the bar magnet 192 rotates together with the pinion 188. On the same plane with the rotating locus of the bar magnet 192, there is a ring 194 fixed concentrically with the shaft 190 on the camera body, the ring 194 having an inner peripheral surface with a diameter a little longer than the longitudinal length of the magnet 192 and functioning as a rotating speed control member as mentioned later. The ring 194 is formed of such material as ferrosilicon plate that is liable to react to magnetic force and having a relatively small residual magnetism. Projections 196, four in number, protrude toward the shaft 190 from the inner peripheral surface of the ring 194 at intervals of 90°. The respective projected end faces of the projections 196 are in very close vicinity to the rotating locus of each end of the bar magnet 192, so that the rotating bar magnet 192 tends to attract the projections 196 every time each end of the magnet 192 is rotated through an angle of 90°. Thus, the bar magnet 192 would be tempted to stop rotating at the position of each projection 196, thereby reducing its rotating speed. Since the speed of the revolution of the bar magnet 192 is controlled, the speed of the movement of the shutter sectors 78 and 80 from the third position to the fourth, as well as the speed of the forward motion of the shutter sector switching lever 94, is also controlled.

Figure 12:
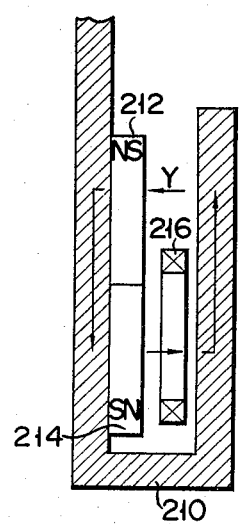
FIG. 12 is a sectional view taken on line XII—XII in FIG. 11.

In another modification of the speed control mechanism 150 of FIG. 11, the partial escape wheel 154 for the above-mentioned embodiment is replaced by a partial ring 198 rotating about the shaft 152. Like the escape wheel 154 of FIG. 1, the ring 198 is provided with a lever 200 one end of which intersects the rocking locus of the direct transmission member 102 of the shutter sector switching lever 94. Further, the ring 198 has an hole 202 formed therein, and a tension spring 206 is stretched between the hole 202 and a pin 204 fixed on the camera body (not shown). By the urging force of the tension spring 206, the ring 198 is always urged to rotate in the counterclockwise direction of FIG. 11. Within the rotating locus of the ring 198, there is a pin 208 fixed on the camera body. The ring 198, which is urged to rotate counterclockwise by the urging force of the tension spring 206, is stopped from rotation in a predetermined position where it is brought in contact with the fixed pin 208. At this time, the one end of the lever 200 is disposed at a fixed distance from the direct transmission member 102 of the shutter sector switching lever 94 which locates the paired shutter sectors 78 and 80 in the third position, as shown in FIG. 11, constituting a delay mechanism. The ring 198 is formed of such material as ferrosilicon plate that is liable to react to magnetic force and having a relatively small residual magnetism. A circumferentially extended portion 210 of the ring 198 is formed, as shown in FIG. 12, of two parallel annular plates spaced from each other at the fixed interval in a direction of perpendicular to the surface of FIG. 11. Within the space between these two plates, two platelike permanent magnets 212 and 124 magnetized in the direction of the thickness of the circumferential extended portion 210 are disposed. And they are fixed on the inside surface one of the two parallel annular plates, abutting each other along the circumferential direction. As shown in FIG. 12, the directions of the respective magnetic fluxes of the two fixed permanent magnets 212 and 214 are in direct opposition, and a line of magnetic flux as indicated by an arrow Y is caused across the aforesaid space. Within the same space, there is disposed an electromagnetic coil 216 which is wound square and functions as a moving speed control member. Two opposite sides of the electromagnetic coil 216 extend substantially in the radial direction of the circumferential extended portion 210. When the ring 198 is rotated in the clockwise direction of FIG. 11 against the urging force of the tension spring 206 by the forward motion of the shutter sector switching lever 94, the electromagnetic coil 216 is supplied with electric current from the external power source (not shown), and such a line of magnetic flux is caused that the ring 198 is rotated in the direction of an arrow Z of FIG. 11, or counterclockwise. By the action of the line of magnetic flux, the speed of the clockwise rotation of the ring 198 is controlled. As a result, the speed of the movement of the paired shutter sectors 78 and 80 from the third position to the fourth, as well as the speed of the forward motion of the shutter sector switching lever 94, may also be controlled.

According to the above-mentioned another modification, the intensity of the magnetic force may be changed by varying the amount of electric current flowed to the electromagnetic coil 216, so that the speed of the clockwise rotation (FIG. 11) of the ring 198 can be changed diversely.

What we claim is:

1. A programmed shutter device comprising:
   a charge mechanism to be charged with a driving force for rotation in response to a film winding operation;
   a shutter driving mechanism connected to the charge mechanism to be rotated by the driving force for rotation which is charged in the charge mechanism;
   a start position regulating member movable between a first position where the regulating member comes in contact with the shutter driving mechanism to stop the rotation of the shutter driving mechanism and a second position where the regulating member is released from the contact with the shutter driving mechanism to allow the rotation of the shutter driving mechanism;
   a release controll means holding the start position regulating member in the first position and releasing the hold of the start position regulating member to shift the start position regulating member to the second position;

a shutter sector means to define the size of an exposure hole movable between a third position to close the exposure hole and fourth position to define the exposure hole;

a connecting mechanism having an elastic member, the connecting mechanism connected to the shutter driving mechanism to be forward and backward reciprocated by the rotation of the shutter driving mechanism, and connected to the shutter sector means to move the shutter sector means from the third position to the fourth position by the elastic member during the forward motion and from the fourth position to the third position by the rotation of the shutter driving mechanism during the backward motion;

a shutter speed determining member movable between a fifth position where the shutter speed determining member is brought in contact with the shutter driving mechanism to stop the rotation of the shutter driving mechanism when the connecting mechanism is completed the forward motion and a sixth position where the shutter speed determining member is released from the contact with the shutter driving mechanism to allow the rotation of the shutter driving mechanism;

a shutter speed control means holding the shutter speed determining member in the fifth position for a fixed time in accordance with the light reflected from a foreground subject and releasing the hold of the shutter speed determimimg member to shift the shutter speed determining member to the sixth position;

a speed control mechanism controlling speed of the forward motion of the connecting mechanism to control the speed of the movement of the shutter sector means from the third position to the fourth position.

2. A programmed shutter device according to claim 1, wherein said shutter sector means includes a pair of shutter sectors.

3. A programmed shutter device according to claim 2, wherein said connecting mechanism includes a driving lever connected to the shutter driving mechanism to be forward and backward reciprocated by the rotation of the shutter driving mechanism, a shutter sector switching lever connected to the driving lever to be forward and backward reciprocated by the reciprocation of the driving lever, and connected to the shutter sector means to move the shutter means from the third position to the fourth position during the forward motion of the shutter sector switching lever and from the fourth position to the third position during the backward motion of the shutter sector switching lever, and a transmission mechanism connected to the driving lever and to the shutter sector switching lever to bring the shutter sector switching lever into a forward motion by the forward motion of the driving lever by means of elasticity of the transmission mechanism during the forward motion of the driving lever and into a backward motion by the backward motion of the driving lever during the backward motion of the driving lever.

4. A programmed shutter device according to claim 3, wherein the transmission mechanism includes a spring having two ends one of which is caught by the driving lever and the other of which is caught by the shutter sector switching lever to bring the shutter switching lever into a forward motion in response to the forward motion of the driving lever by means of the elasticity of the spring during the forward motion of the driving lever, and a direct transmission memnber on the shutter sector switching lever to be brought in contact with the driving lever during the backward motion of the driving lever, and to bring the shutter sector switching lever into a backward motion by the backward motion of the driving lever.

5. A programmed shutter device according to claim 4, wherein said spring is a torsion coil spring.

6. A programmed shutter device according to claim 1, wherein said connecting mechanism includes a driving lever connected to said shutter driving mechanism to be forward and backward reciprocated by the rotation of said shutter driving mechanism, a shutter sector switching lever connected to the driving lever to be forward and backward reciprocated by the reciprocation of the driving lever, and connected to said shutter sector means to move the shutter sector means from said third position to said fourth position during the forward motion of the shutter sector switching lever and from the fourth position to the third position during the backward motion of the shutter sector switching lever, and a transmission mechanism connected to driving lever and to said shutter sector switching lever to bring the shutter sector switching lever into a forward motion by the forward motion of the driving lever by means of the transmission mechanism during the forward motion of the driving lever and into a backward motion by the backward motion of the driving lever during the backward motion of the driving lever.

7. A programmed shutter device according to claim 6, wherein said transmission mechanism includes a spring having two ends one of which is caught by said driving lever and the other of which is caught by said shutter sector switching lever to bring the shutter sector switching lever into a forward motion in response to the forward motion of the driving lever by means of the elasticity of the spring during the forward motion of the driving lever, and a direct transmission member on said shutter sector switching lever to be brought in contact with the driving lever during the backward motion of said driving lever, and to bring said shutter sector switching lever into a backward motion by the backward motion of said driving lever.

8. A programmed shutter device according to claim 7, wherein said spring is a torsion coil spring.

9. A programmed shutter device according to any one of claims 3 to 8, wherein said speed control mechanism includes an escape wheel operatively connected to said shutter sector switching lever to be rotated by the forward motion of said shutter sector switching lever, and an anchor escapement engaging said escape wheel to control the rotating speed of said escape wheel during the forward motion of said shutter sector switching lever, thereby controlling the speed of the movement of said shutter sector means from said third position to said fourth position.

10. A programmed shutter device according to claim 9, wherein said speed control mechanism further includes a delay mechanism to delay the drive of said escape wheel by the forward motion of said shutter sector switching lever only at the initial stage of the forward motion of said shutter sector switching lever.

11. A programmed shutter device according to claim 10, wherein said escape wheel is provided with a lever having one end intersecting the locus of the reciprocation of said shutter sector switching lever so that said one end is brought in contact with said shutter sector switching lever to drive said escape wheel to rotate in response to the forward motion of said shutter sector switching lever during the forward motion of said shutter sector switching lever, said one end of said lever being disposed at a fixed distance from said shutter sector switching lever when said shutter sector means is located in said third position and constituting said delay mechanism.

12. A programmed shutter device according to any one of claims 3 to 8, wherein said speed control mechanism includes a magnet operatively connected to said shutter sector switching lever and driven to rotate by the forward motion of said shutter sector switching lever, and a rotating speed control member disposed in the vicinity of the rotating locus of the magnetic poles of said magnet and attracting said magnet to control the rotating speed of said magnet.

13. A programmed shutter device according to claim 12, wherein said speed control mechanism further includes a delay mechanism to delay the drive of said magnet by the forward motion of said shutter sector switching lever only at the initial stage of the forward motion of said shutter sector switching lever.

14. A programmed shutter device according to claim 13, wherein said magnet is provided with a sector wheel having one end intersecting the locus of the reciprocation of said shutter sector switching lever and rotating when said one end is brought in contact with said shutter sector switching lever during the forward motion of said shutter sector switching lever, and a toothed wheel connected to said magnet and engaging said sector wheel to rotate by the rotation of said sector wheel, said one end of said sector wheel being disposed at a fixed distance from said shutter sector switching lever when said shutter sector means is located in said third position and constituting said delay mechanism.

15. A programmed shutter device according to any one of claims 3 to 8, wherein said speed control mechanism includes a magnet operatively connected to said shutter sector switching lever and driven to move by the forward motion of said shutter sector switching lever, and a moving speed control member disposed in the vicinity of the moving locus of the magnetic poles of said magnet and attracting said magnet to control the moving speed of said magnet.

16. A programmed shutter device according to claim 15, wherein said speed control mechanism further includes a delay mechanism to delay the drive of said magnet only at the initial stage of the forward motion of said shutter sector switching lever.

17. A programmed shutter device according to claim 16, wherein said magnet is provided with a rockable lever having two ends one of which is connected to said magnet and the other of which intersects the locus of the reciprocation of said shutter sector switching lever, and rotating when said other end is brought in contact with said shutter switching lever at the forward motion of said shutter sector switching lever so that said magnet is driven to move by the forward motion of said shutter sector switching lever, said other end of said rockable lever being disposed at a fixed distance from said shutter sector switching lever when said shutter sector means is located in said third position and constituting said delay mechanism.

18. A programmed shutter device according to any one of claim 3 to 8, wherein said speed control mechanism includes a magnet operatively connected to said shutter sector switching lever and driven to move by the forward motion of said shutter sector switching lever, and an electromagnet disposed in the vicinity of the moving locus of the magnetic poles of said magnet and attracting said magnet to control the moving speed of said magnet.

19. A programmed shutter device according to claim 18, wherein said speed control mechanism further includes a delay mechanism to delay the drive of said magnet only at the initial stage of the forward motion of said shutter sector switching lever.

20. A programmed shutter device according to claim 19, wherein said magnet is provided with a rockable lever having two ends one of which is connected to said magnet and the other of which intersects the locus of the reciprocation of said shutter sector switching lever, and rotating when said other end is brought in contact with said shutter sector switching lever at the forward motion of said shutter sector switching lever so that said magnet is driven to move by the forward motion of said shutter sector switching lever, said other end of said rockable lever being disposed at a fixed distance from said shutter sector switching lever when said shutter sector means is located in said third position and constituting said delay mechanism.

21. A programmed shutter device according to claim 1, wherein said shutter speed control means includes a electrical shutter speed control means holding the shutter determining member in the fifth position by means of magnetic force and releasing the hold of the shutter speed determining member to shift the shutter speed determining member to the sixth position, and a circuit means for controlling electrically-controlled shutter operating in response to the start of rotation of said shutter driving mechanism and controlling the time to hold said electrical shutter speed driving member in said fifth position by means of the magentic force of the electrical shutter speed control means in accordance with the light reflected from the foreground subject.

22. A programmed shutter device according to claim 21, wherein said shutter sector means includes a pair of shutter sectors.

23. A programmed shutter device according to claim 22, wherein said connecting mechanism includes a driving lever connected to the shutter driving mechanism to be forward and backward reciprocated by the rotation of the shutter driving mechanism, a shutter sector switching lever connected to the driving lever to be forward and backward reciprocated by the reciprocation of the driving lever, and connected to the shutter sector means to move the shutter sector means from the third position to the fourth position during the forward motion of the shutter sector switching lever and from the fourth position to the third position during the backward motion of the shutter sector switching lever, and a transmission mechanism connected to the driving lever and to the shutter sector switching lever to bring the shutter sector switching lever into a forward motion by the forward motion of the driving lever by means of elasticity of the transmission mechanism during the forward motion of the driving lever and into a backward motion by the backward motion of the driving lever during the backward motion of the driving lever.

24. A programmed shutter device according to claim 23, wherein the transmission mechanism includes a spring having two ends one of which is caught by the driving lever and the other of which is caught by the shutter sector switching lever to bring the shutter sector switching lever into a forward motion in response to the forward motion of the driving lever by means of elasticity of the spring during the forward motion of the driving lever, and a direct transmission member on the shutter sector switching lever to be brought in contact with the driving lever during the backward motion of the driving lever, and to bring the shutter sector switching lever into a backward motion by the backward motion of the driving lever.

25. A programmed shutter device according to claim 24, wherein said spring is a torsion coil spring.

26. A programmed shutter device according to claim 21, wherein said connecting mechanism includes a driving lever connected the said shutter driving mechanism to be forward and backward reciprocated by the rotation of said shutter driving mechanism, a shutter sector switching lever connected to the driving lever to be forward and backward reciprocated by the reciprocation of the driving lever, and connected to said shutter sector means to move the shutter sector means from said third position to said fourth position during the forward motion of the shutter sector switching lever and the fourth position to the third position during the backward motion of the shutter sector switching lever, and a transmission mechanism connected to said driving lever and to said shutter sector switching lever, to bring the shutter sector switching lever into a forward motion by the forward motion of the driving lever by means of the transmission mechanism during the forward motion of the driving lever and into a backward motion by the backward motion of the driving lever during the backward motion of the driving lever.

27. A programmed shutter device according to claim 26, wherein said transmission mechanism includes a spring having two ends one of which is caught by said driving lever and the other of which is caught by said shutter sector switching lever to bring the shutter sector switching lever into a forward motion in response to the forward motion of the driving lever by means of a elasticity of the spring during the forward motion of the driving lever, and a direct transmission member on said shutter sector switching lever to be brought in contact with the driving lever during the backward motion of said driving lever, and to bring said shutter sector switching lever into a backward motion by the backward motion of said driving lever.

28. A programmed shutter device according to claim 27, wherein said spring is a torsion coil spring.

29. A programmed shutter device according to any one of claims 23 to 28, wherein said speed control mechanism includes an escape wheel operatively connected to said shutter sector switching lever to be rotated by the forward motion of said shutter sector switching lever, and an anchor escapement engaging said escape wheel to control the rotating speed of said escape wheel during the forward motion of said shutter sector switching lever, thereby controlling the speed of the movement of said shutter sector means from said third position to said fourth position.

30. A programmed shutter device according to claim 29, wherein said speed control mechanism further includes a delay mechanism to delay the drive of said escape wheel by the forward motion of said shutter sector switching lever only at the initial stage of the forward motion of said shutter sector switching lever.

31. A programmed shutter device according to claim 30, wherein said escape wheel is provided with a lever having one end intersecting the locus of the reciprocation of said shutter sector switching lever so that said one end is brought in contact with said shutter sector switching lever to drive said escape wheel to rotate in response to the forward motion of said shutter sector switching lever during the forward motion of said shutter sector switching lever, said one end of said lever being disposed at a fixed distance from said shutter sector switching lever when a said shutter sector means is located in said third position and constituted said delay mechanism.

32. A programmed shutter device according to any one of claims 23 to 28, wherein said speed control mechanism includes a magnet operatively connected to said shutter sector switching lever and driven to rotate by the forward motion of said shutter sector switching lever, and a rotating speed control member disposed in the vicinity of the rotating locus of the magnetic poles of said magnet and attracting said magnet to control the rotating speed of said magnet.

33. A programmed shutter device according to claim 32, wherein said speed control mechanism further includes a delay mechanism to delay the drive of said magnet by the forward motion of said shutter sector switching lever only at the initial stage of the forward motion of said shutter sector switching lever.

34. A programmed shutter device according to claim 33, wherein said magnet is provided with a sector wheel having one end intersecting the locus of the reciprocation of said shutter sector switching lever and rotating when said one end is brought in contact with said shutter sector switching lever during the forward motion of said shutter sector switching lever, and a toothed wheel connected to said magnet and engaging said sector wheel to rotate by the rotation of said sector wheel, said one end of said sector wheel being disposed at a fixed distance from said shutter sector switching lever when said shutter sector means is located in said third position and constituting said delay mechanism.

35. A programmed shutter device according to any one of claims 23 to 28, wherein said speed control mechanism includes a magnet operatively connected to said shutter sector switching lever and driven to move by the forward motion of said shutter sector switching lever, and a moving speed control member disposed in the vicinity of the moving locus of the magnetic poles of said magnet and attracting said magnet to control the moving speed of said magnet.

36. A programmed shutter device according to claim 35, wherein said speed control mechanism further includes a delay mechanism to delay the drive of said magnet only at the initial stage of the forward motion of said shutter sector switching lever.

37. A programmed shutter device according to claim 36, wherein said magnet is provided with a rockable lever having two ends one of which is connected to said magnet and the other of which intersects the locus of the reciprocation of said shutter sector switching lever, and rotating when said other end is brought in contact with said shutter sector switching lever at the forward motion of said shutter sector switching lever so that said magnet is driven to move by the forward motion of said shutter sector switching lever, said other end of said rockable lever being disposed at a fixed distance from said shutter sector switching lever when said shutter sector means is located in said third position and constituting said delay mechanism.

38. A programmed shutter device according to any one of claims 23 to 28, wherein said speed control mechanism includes a magnet operatively connected to said shutter sector switching lever and driven to move by the forward motion of said shutter sector switching lever, and an electromagnet disposed in the vicinity of the moving locus of the magnetic poles of said magnet and attracting said magnet to control the moving speed of said magnet.

39. A programmed shutter device according to claim 38, wherein said speed control mechanism further includes a delay mechanism to delay the drive of said magnet only at the initial stage of the forward motion of said shutter sector switching lever.

40. A programmed shutter device according to claim 39, wherein said magnet is provided with a rockable lever having two ends one of which is connected to said magnet and the other of which intersects the locus of the reciprocation of said shutter sector switching lever, and rotating when said other end is brought in contact with said shutter sector switching lever at the forward motion of said shutter sector switching lever so that said magnet is driven to move by the forward motion of said shutter sector switching lever, said other end of said rockable lever being disposed at a fixed distance from said shutter sector switching lever when said shutter sector means is located in said third position and constituting said delay mechanism.

41. A programmed shutter device according to claim 21, wherein the release control means includes a electrically-controlled shutter means holding the start position regulating member in the first position by means of magnetic force and releasing the hold of the start position regulating member to shift the start position regulating member to the second position.

42. A programmed shutter device according to claim 41, wherein said shutter sector means includes a pair of shutter sectors.

43. A programmed shutter device according to claim 42, wherein said connecting mechanism includes a driving lever connected to the shutter driving mechanism to be forward and backward reciprocated by the rotation of the shutter driving mechanism, a shutter sector switching lever connected to the driving lever to be forward and backward reciprocated by the reciprocation of the driving lever, and connected to the shutter sector means to move the shutter sector means from the third position to the fourth position during the forward motion of the shutter sector switching lever and from the fourth position to the third position during the backward motion of the shutter sector switching lever, and a transmission mechanism connected to the driving lever and to the shutter sector switching lever to bring the shutter sector switching lever into a forward motion by the forward motion of the driving lever by means of elasticity of the transmission mechanism during the forward motion of the driving lever and into a backward motion by the backward motion of the driving lever during the backward motion of the driving lever.

44. A programmed shutter device according to claim 43, wherein the transmission mechanism includes a spring having two ends one of which is caught by the driving lever and the other of which is caught by the shutter sector switching lever to bring the shutter sector switching lever into a forward motion in response to the forward motion of the driving lever by means of elasticity of the spring during the forward motion of the driving lever, and a direct transmission member on the shutter sector switching lever to be brought in contact with the driving lever during the backward motion of the driving lever, and to bring the shutter sector switching lever into a backward motion by the backward motion of the driving lever.

45. A programmed shutter device according to claim 44, wherein said spring is a torsion coil spring.

46. A programmed shutter device according to claim 41, wherein said connecting mechanism includes a driving lever connected to said shutter driving mechanism to be forward and backward reciprocated by the rotation of said shutter driving mechanism, a shutter sector switching lever connected to the driving lever to be forward and backward reciprocated by the reciprocation of the driving lever, and connected to said shutter sector means to move the shutter sector means from said third position to said fourth position during the forward motion of the shutter sector switching lever and from the fourth position to the third position during the backward motion of the shutter sector switching lever, and a transmission mechanism connected to said driving lever and to said shutter sector switching lever to bring the shutter sector switching lever into a forward motion by the forward motion of the driving lever by means of the transmission mechanism during the forward motion of the driving lever and into a backward motion by the backward motion of the driving lever during the backward motion of the driving lever.

47. A programmed shutter device according to claim 46, wherein said transmission mechanism includes a spring having two ends one of which is caught by said driving lever and the other of which is caught by said shutter sector switching lever to bring the shutter sector switching lever into a forward motion in response to the forward motion of the driving lever by means of a elasticity of the spring during the forward motion of the driving lever, and a direct transmission member on said shutter sector switching lever to be brought in contact with the driving lever during the backward motion of said driving lever, and to bring said shutter sector switching lever into a backward motion by the backward motion of said driving lever.

48. A programmed shutter device according to claim 47, wherein said spring is a torsion coil spring.

49. A programmed shutter device according to any one of claims 43 to 48, wherein said speed control mechanism includes an escape wheel operatively connected to said shutter sector switching lever to be rotated by the forward motion of said shutter sector switching lever, and an anchor escapement engaging said escape wheel to control the rotating speed of said escape wheel during the forward motion of said shutter sector switching lever, thereby controlling the speed of the movement of said shutter sector means from said third position to said fourth position.

50. A programmed shutter device according to claim 49, wherein said speed control mechanism further includes a delay mechanism to delay the drive of said escape wheel by the forward motion of said shutter sector switching lever only at the initial stage of the forward motion of said shutter sector switching lever.

51. A programmed shutter device according to claim 50, wherein said escape wheel is provided with a lever having one end intersecting the locus of the reciprocation of said shutter sector switching lever so that said one end is brought in contact with said shutter sector switching lever to drive said escape wheel to rotate in response to the forward motion of said shuttr sector switching lever during the forward motion of said shutter sector switching lever, said one end of said lever being disposed at a fixed distance from said shutter sector switching lever when said shutter sector means is located in said third position and constituting said delay mechanism.

52. A programmed shutter device according to any one of claims 43 to 48, wherein said speed control mechanism includes a magnet operatively connected to said shutter sector switching lever and driven to rotate by the forward motion of said shutter sector switching lever, and a rotating speed control member disposed in the vicinity of the rotating locus of the magnetic poles of said magnet and attracting said magnet to control the rotating speed of said magnet.

53. A programmed shutter device according to claim 52, wherein said speed control mechanism further includes a delay mechanism to delay the drive of said magnet by the forward motion of said shutter sector switching lever only at the initial stage of the forward motion of said shutter sector switching lever.

54. A programmed shutter device according to claim 53, wherein said magnet is provided with a sector wheel having one end intersecting the locus of the receiprocation of said shutter sector switching lever and rotating when said one end is brought in contact with said shutter sector switching lever during the forward motion of said shutter sector switching lever, and a toothed wheel connected to said magnet and engaging said sector wheel to rotate by the rotation of said sector wheel, said one end of said sector wheel being disposed at a fixed distance from said shutter sector switching lever when said shutter sector means is located in said third position and constituting said delay mechanism.

55. A programmed shutter device according to any one of claims 43 to 48, wherein said speed control mechanism includes a magnet operatively connected to said shutter sector switching lever and driven to move by the forward motion of said shutter sector switching lever, and a moving speed control member disposed in the vicinity of the moving locus of the magnetic poles of said magnet and attracting said magnet to control the moving speed of said magnet.

56. A programmed shutter device according to claim 55, wherein said speed control mechanism further includes a delay mechanism to delay the drive of said magnet only at the initial stage of the forward motion of said shutter sector switching lever.

57. A programmed shutter device according to claim 56, wherein said magnet is provided with a rockable lever having two ends one of which is connected to said magnet and the other of which intersects the locus of the reciprocation of said shutter sector switching lever, and rotating when said other end is brought in contact with said shutter sector switching lever at the forward motion of said shutter section switching lever so that said magnet is driven to move by the forward motion of said shutter sector switching lever, said other end of said rockable lever being disposed at a fixed distance from said shutter sector switching lever when said shutter sector means is located in said third position and constituting said delay mechanism.

58. A programmed shutter device according to any one of claims 43 to 48, wherein said speed control mechanism includes a magnet operatively connected to said shutter sector switching lever and driven to move by the forward motion of said shutter sector switching lever, and an electromagnet disposed in the vicinity of the moving locus of the magnetic polse of said magnet and attracting said magnet to control the moving speed of said magnet.

59. A programmed shutter device according to claim 58, wherein said speed control mechanism further includes a delay mechanism to delay the drive of said magnet only at the initial stage of the forward motion of said shutter sector switching lever.

60. A programmed shutter device according to claim 59, wherein said magnet is provided with a rockable lever having two ends one of which is connected to said magnet and the other of which intersects the locus of the reciprocation of said shutter sector switching lever, and rotating when said other end is brought in contact with said shutter sector switching lever at the forward motion of said shutter sector switching lever so that said magnet is driven to move by the forward motion of said shutter sector switching lever, said other end of said rockable lever being disposed at a fixed distance from said shutter sector switching lever when said shutter sector means is located in said third position and constituting said delay mechanism.

* * * * *